United States Patent
Joshi et al.

(10) Patent No.: US 11,178,034 B1
(45) Date of Patent: Nov. 16, 2021

(54) RESILIENT NETWORK FRAMEWORK FOR MITIGATING PREDICTED RESPONSE TIME DELAYS

(71) Applicant: BANK OF AMERICA CORPORATION, Charlotte, NC (US)

(72) Inventors: Chintan B. Joshi, Lawrence Township, NJ (US); Vijaykumar Goyal, East Windsor, NJ (US); Santosh Vasant Mali, Ewing, NJ (US); Neelakanteshwar Palla, Furlong, PA (US); Chandan Pankaj, Robbinsville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 6 days.

(21) Appl. No.: 16/943,236

(22) Filed: Jul. 30, 2020

(51) Int. Cl.
*H04L 12/26* (2006.01)
*H04L 12/911* (2013.01)
*H04L 12/927* (2013.01)
*H04L 12/24* (2006.01)

(52) U.S. Cl.
CPC ...... *H04L 43/0852* (2013.01); *H04L 41/5035* (2013.01); *H04L 43/04* (2013.01); *H04L 43/0829* (2013.01); *H04L 43/16* (2013.01); *H04L 47/781* (2013.01); *H04L 47/805* (2013.01); *H04L 47/822* (2013.01); *H04L 43/067* (2013.01)

(58) Field of Classification Search
CPC ..... G06F 9/541; H04L 41/5035; H04L 43/04; H04L 43/0829; H04L 43/0852; H04L 43/0864; H04L 43/067; H04L 43/16; H04L 47/781; H04L 47/805; H04L 47/822

See application file for complete search history.

(56) References Cited

U.S. PATENT DOCUMENTS

| | | | | |
|---|---|---|---|---|
| 7,720,954 B2* | 5/2010 | Raja | ................... | H04L 41/5009 709/223 |
| 8,230,055 B2* | 7/2012 | Kondamuru | ........ | H04L 41/5009 709/223 |
| 9,483,313 B2* | 11/2016 | Bouw | ..................... | H04L 43/08 |
| 9,544,403 B2* | 1/2017 | Tran | ..................... | H04L 67/025 |
| 9,774,654 B2* | 9/2017 | Tran | ..................... | H04L 67/025 |
| 10,110,688 B2* | 10/2018 | Zarn | ..................... | H04L 67/025 |

(Continued)

*Primary Examiner* — George C Neurauter, Jr.
(74) *Attorney, Agent, or Firm* — Michael A. Springs; Moore & Van Allen PLLC; James C. Edwards

(57) ABSTRACT

A resilient network call management framework that automatically detects slow Application Programming Interfaces (APIs) at downstream dependent applications based on constantly measuring and monitoring the response time coming from such applications. Once a slow API has been identified, the framework provides the capability to temporarily shut down (otherwise referred to herein as, "short-circuit") the network call path associated therewith until the monitoring determines that the response time is back to an acceptable level (i.e., returns to a healthy status). Implemented in conjunction with a shared services server hosting different service applications, processing by the framework may be limited to only those service applications or network calls deemed non-critical, such that, critical service applications or network calls are not subjected to being shut down regardless of response time.

20 Claims, 8 Drawing Sheets

(56) References Cited

U.S. PATENT DOCUMENTS

| | | | |
|---|---|---|---|
| 10,360,087 B2 * | 7/2019 | Suter | G06F 11/364 |
| 10,505,865 B2 * | 12/2019 | Bouw | G06F 9/5077 |
| 10,511,541 B2 * | 12/2019 | Bouw | H04L 43/16 |
| 10,521,235 B1 * | 12/2019 | Balasubramanian | G06F 9/3838 |
| 10,644,962 B2 * | 5/2020 | O'Neill | G06F 9/541 |
| 10,747,544 B1 * | 8/2020 | Balasubramanian | G06F 11/3055 |
| 10,922,083 B2 * | 2/2021 | Balasubramanian | G06F 11/3409 |
| 2015/0222504 A1 * | 8/2015 | Srivastava | G06F 11/3041 709/224 |
| 2016/0225042 A1 * | 8/2016 | Tran | G06F 11/3006 |
| 2016/0225043 A1 * | 8/2016 | Tran | G06F 11/3433 |
| 2017/0085621 A1 * | 3/2017 | Tran | H04L 41/5009 |
| 2020/0120000 A1 * | 4/2020 | Parthasarathy | H04L 67/10 |
| 2021/0075700 A1 * | 3/2021 | Palladino | G06F 11/3428 |
| 2021/0165659 A1 * | 6/2021 | Balasubramanian | G06F 11/3065 |

* cited by examiner

RESILIENT NETWORK FRAMEWORK FOR MITIGATING PREDICTED RESPONSE TIME DELAYS

FIELD OF THE INVENTION

The present invention relates to managing network calls to dependent applications/data sources, and more particularly to managing network calls coming from different applications hosted on shared servers, such that, network calls deemed non-critical can be short circuited (i.e., shut down) in the event that the current response time is beyond an allowable limit, while network calls deemed critical are processed absent response time limitations.

BACKGROUND

An entity, such as a large enterprise or the like, may have numerous applications in use that provide resources or perform actions for users associated with the entity (e.g., associates, clients, customers or the like). These applications, which are typically hosted on servers, are configured to make network calls to downstream dependent applications/data sources to perform requested actions or retrieve data for the users. In the large enterprise environment, in which a high volume of users are constantly logged into these applications, the volume of such network calls is correspondingly high. While the large enterprise may implement a sufficiently high number of servers to host the applications and place the calls, problems may still exist because the servers are calling multiple dependencies/data sources.

In the event that one of the dependent applications goes down or is experiencing uncharacteristically long delays in responding (e.g., typically responds in milliseconds and is now responding in seconds), the servers scale-up with multiple network call threads being generated in attempt to accommodate the high volume of users requiring immediate response. In the event that the downstream dependent applications slow down, such that, the downstream applications relentlessly generate network call requests, the network call requests will queue up, slowing further the overall response time. Merely monitoring the servers for processing and memory usage will not alleviate the problem, since the problems lies not with the servers themselves but rather the inability of the servers receiving the responses from the network call requests.

The biggest impact of such a response latency problem is seen in the shared services scenario, in which the servers host multiple different applications. In such a scenario, some of these applications or specific network calls being made by some of the applications are seen as critical to maintaining business continuity. These so-called critical applications can not tolerate a latency in network call response. However, in instances in which other non-critical applications hosted on the shared server are experiencing a high volume of network call response delays, such delays have an adverse effect on the response time of critical application network calls due to the aforementioned accumulation of call requests queuing up at the server.

Therefore a need exists to develop systems, methods, computer program products and the like that address these and other problems. Specifically, the desired systems, methods, computer program products and the like, should provide for recognizing when certain downstream dependent applications are experiencing delays and take appropriate action based on the delay. Moreover, the desired systems, methods and computer program should alleviate problems with such delays occurring at shared servers hosting multiple different application, some of which are deemed to be critical to business concerns and, as such, cannot tolerate network call response delays. In addition, a need exists for the entity to be able to readily identify, in real-time, at which downstream dependent applications delays are currently occurring and their impact on other downstream and/or downstream applications, so that an entity can determine impact and/or make necessary resource adjustments to avoid overall delays throughout across the entirety of applications.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer-implemented methods, computer program products and the like that provide for a network call management framework that automatically detects slow Application Programming Interfaces (APIs) at downstream dependent applications based on constantly measuring and monitoring the response time coming from downstream dependent applications. Once a slow API, otherwise referred to as "unhealthy" API has been identified, the present invention provides the capability to temporarily shut down (otherwise referred to herein as, "short-circuit") the network call path associated therewith until the monitoring determines that the response time is back to an acceptable level (i.e., returns to a healthy state).

In specific embodiments of the invention, the call management framework of the present invention is implemented in conjunction with shared servers hosting a plurality of different application. Some of these different applications or specific network call requests associated with an application may be deemed to be critical to the entity running the applications. As such, in specific embodiments the invention determines at the onset whether a network call request is coming from an application deemed critical or non-critical or whether the network call itself is deemed critical or non-critical. In such embodiments of the invention, only the calls coming from non-critical applications or otherwise non-critical network call requests are processed via the call management framework of the present invention. In this regard, critical applications or critical network call requests are not subject to being temporarily shut down/short-circuited and will proceed regardless of delays in the response time seen by the corresponding API.

Moreover, the present invention provides a user interface/dashboard that allows users to observe the current status of all of the dependent applications. In this regard, the dashboard is configured to indicate which of the network call paths are currently functional, which of the network paths are currently down (non-functional), which of the network paths are currently slowed down and as a result shut-down/short-circuited and which of the network paths are currently not being monitored and, thus, the status of which is unknown. Such information is valuable in allow a user to visualize the various links and dependencies in the network call outs and to identify and address, in real time, issues as they become known.

A system for managing out-bound network calls defines first embodiments of the invention. The system includes a shared server configured to host a plurality of service applications. Each of the service applications configured to receive user requests that require network calls to one or more of a plurality of dependent applications. The system additionally includes a computing platform having a memory and at least one processing device in communication with the memory. In addition, the system includes a network call management framework that is stored in the memory and executable by the processor, and configured to:

The framework is configured to receive a network call request, from one of the plurality of service applications, that requests a network call to one of the dependent applications. The network call requests and includes a network call identifier and a dependent application identifier. In response to receiving the network call request, the framework is configured to determine, based on the dependent application identifier, a current response status of the dependent application as one of a healthy status or an unhealthy status based on the current response time associated with the dependent application. In response to determining that the current response status is the unhealthy status, the framework is configured to return a response to the service application indicating that the network call cannot currently be attempted or, in some embodiments of the invention, attempt a retry. In response to determining that the current response status is the healthy status, the framework is further configured to (i) obtain, based on the network call identifier and the dependent application identifier, a dynamically updated maximum allowed response time (i.e., a timeout) for the network call, and (ii) attempt to conduct the network call with the dependent application within the maximum allowed response time.

In specific embodiments of the system, the shared server further comprises call management logic configured to determine, based on at least one of the service application and the dependent application, that the network call request requires processing by the network call management framework. For example, the logic may be configured to determine that the network call requires processing by the network call management framework based on the service application or the specific network call to the dependent application being designated as non-critical.

In further specific embodiments of the system, the network call management framework is configured to determine the current response status of the dependent application by accessing a listing of dependent applications currently having the unhealthy status, wherein the unhealthy state is based on a corresponding current response time. In related specific embodiments of the system, the network call management framework is further configured, in response to determining that the dependent application is included in the listing of dependent applications having the unhealthy status, determine whether a retry attempt for the network call is required based on one of (i) a time between a previous network call attempt to the dependent application, and (ii) a predetermined number of network call requests to the dependent application.

In further specific embodiments of the system, the network call management framework is further configured, in response to attempting to conduct the network call with the dependent application, receive a response from the dependent application within the maximum allowed response time and validate an average response time for the dependent application. In specific embodiments of the system, the network call management framework configured to validate the average response time by (i) determining whether a current response time is not greater by a predetermined amount than the current average response time, and (ii) in response to determining that the current response time is not greater than the predetermined amount of the current average response time, update the average response time as a mean of a predetermined number of last-in-time previous response times and the current response time.

In further specific embodiments of the system, the network call management framework is configured to, in response to determining that the current response time is greater by the predetermined amount than the current average response time, determine whether to include the dependent application in the listing of dependent applications currently in the unhealthy state. In specific embodiments of the system, the network call management is configured to determine whether to include the dependent application in the listing of dependent applications currently in the unhealthy state based on one or more of ((i) the response time is greater than twice an average response time, (ii) a number of slow network calls to the dependent application is greater than a predetermined threshold number of calls, (iii) the network calls exceeds the maximum threshold of continuous slow calls, and (iv) a queue length at the shared server is increasing, add the dependent application to the listing of dependent applications currently in an unhealthy state.

In other specific embodiments of the system, the network call management framework is further configured to, in response to attempting to conduct the network call with the dependent application within the maximum allowed response time and failing to receive a response from the dependent application within the maximum allowed response time, determine whether to include the dependent application in the listing of dependent applications currently in the unhealthy state based on exceeding a predetermined threshold of consecutive calls to the dependent application that fail to respond within the maximum allowable time.

A computer-implemented method for managing outbound network calls to dependent applications defines second embodiments of the invention. The method is executed by one or more processing devices. The method includes receiving a network call request, from one of the plurality of service applications hosted on shared server, that requests a network call to one of the dependent applications. The network call requests and includes a network call identifier and a dependent application identifier. The method further includes determining, based on the dependent application identifier, a current response status of the dependent application as one of a healthy status or an unhealthy status based on the current response time associated with the dependent application. Further, the method includes, in response to determining that the current response status is the unhealthy status, return a response to the service application indicating that the network call cannot currently be attempted. In addition, the method includes in response to determining that the current response status is the healthy status, (i) obtain, based on the network call identifier and the dependent application identifier, a dynamically updated maximum allowed response time for the network call, and (ii) attempt to conduct the network call with the dependent application within the maximum allowed response time.

In specific embodiments the method further includes determining, based on at least one of the service application and the dependent application, that the network call request requires determination of whether the network call can be attempted.

In other specific embodiments of the method, determining the current response status of the dependent application further comprises accessing a listing of dependent applications currently having the unhealthy status, wherein the unhealthy status is based at least on a corresponding current response time. In such embodiment the method may further include, in response to determining that the dependent application is included in the listing of dependent applications currently having the unhealthy status, determining whether a retry attempt for the network call is required based on one of (i) a time between previous network call attempts to the dependent application, or (ii) a predetermined number of network call requests to the dependent application. In other related embodiments, the method may further include, in response to attempting to conduct the network call with the dependent application within the maximum allowed response time, receiving a response from the dependent application within the maximum allowed response time and validating an average response time for the dependent application by (i) determining whether a current response time is greater by a predetermined amount than the current average response time, and (ii) in response to determining that the current response time is not greater than the predetermined amount of the current average response time, update the average response time as a mean of a predetermined number of last-in-time previous response times and the current response time.

In other related embodiments the method may further include, in response to determining that the current response time is greater by the predetermined amount than the current average response time, determining whether to include the dependent application in the listing of dependent applications currently in the unhealthy state based on one or more of (i) the response time is greater than twice an average response time, (ii) a number of slow network calls to the dependent application is greater than a predetermined threshold number of calls, (iii) the network calls exceeds the maximum threshold of continuous slow calls, and (iv) a queue length at the shared server is increasing, add the dependent application to the listing of dependent applications currently in an unhealthy state.

A computer program product including non-transitory computer-readable medium defines third embodiments of the invention. The computer-readable medium includes a first set of codes configured to cause a computer processor device to receive a network call request, from one of the plurality of service applications hosted on shared server, that requests a network call to one of the dependent applications. The network call requests and includes a network call identifier and a dependent application identifier. IN addition, the computer-readable medium includes a second set of codes for causing a computer processing device to determine, based on the dependent application identifier, a current response status of the dependent application as one of a healthy status or an unhealthy status based on the current response time associated with the dependent application. Further, the computer-readable medium includes a third set of codes for causing a computer processing device to, in response to determining that the current response status is the unhealthy status, return a response to the service application indicating that the network call cannot currently be attempted. Moreover, the computer-readable medium includes a fourth set of codes for causing a computer processing device to, in response to determining that the current response status is the healthy status, (i) obtain, based on the network call identifier and the dependent application identifier, a dynamically updated maximum allowed response time for the network call, and (ii) attempt to conduct the network call with the dependent application within the maximum allowed response time.

In specific embodiments of the computer program product, the computer-readable medium further comprises a fifth set of codes for causing a computer processing device to determine, based on at least one of the service application and the dependent application, that the network call request requires determination of whether the network call can be attempted.

In additional embodiments of the computer program product, the second set of codes is further configured to cause the computer processor device to access a listing of dependent applications currently having the unhealthy status based on corresponding current response times. In such embodiments of the computer program product, the second set of codes is further configured to cause the computer processing device to, in response to determining that the dependent application is included in the listing of dependent applications currently having the unhealthy status, determine whether a retry attempt for the network call is required based on one of (i) a time between previous network call attempts to the dependent application, or (ii) a predetermined number of network call requests to the dependent application. In further related embodiments of the computer program product, the second set of codes is further configured to cause the computing device to, in response to attempting to conduct the network call with the dependent application within the maximum allowed response time, receive a response from the dependent application within the maximum allowed response time and validate an average response time for the dependent application by (i) determining whether a current response time is greater by a predetermined amount than the current average response time, and (ii) in response to determining that the current response time is not greater than the predetermined amount of the current average response time, update the average response time as a mean of a predetermined number of last-in-time previous response times and the current response time.

Thus, systems, apparatus, methods, and computer program products herein described in detail below provide for network call management framework that automatically detects slow Application Programming Interfaces (APIs) at downstream dependent applications based on constantly measuring and monitoring the response time coming from downstream dependent applications. Once a slow API, otherwise referred to as "unhealthy" API has been identified, the present invention provides the capability to temporarily shut down (otherwise referred to herein as, "short-circuit") the network call path associated therewith until the monitoring determines that the response time is back to an acceptable level (i.e., returns to a healthy state).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
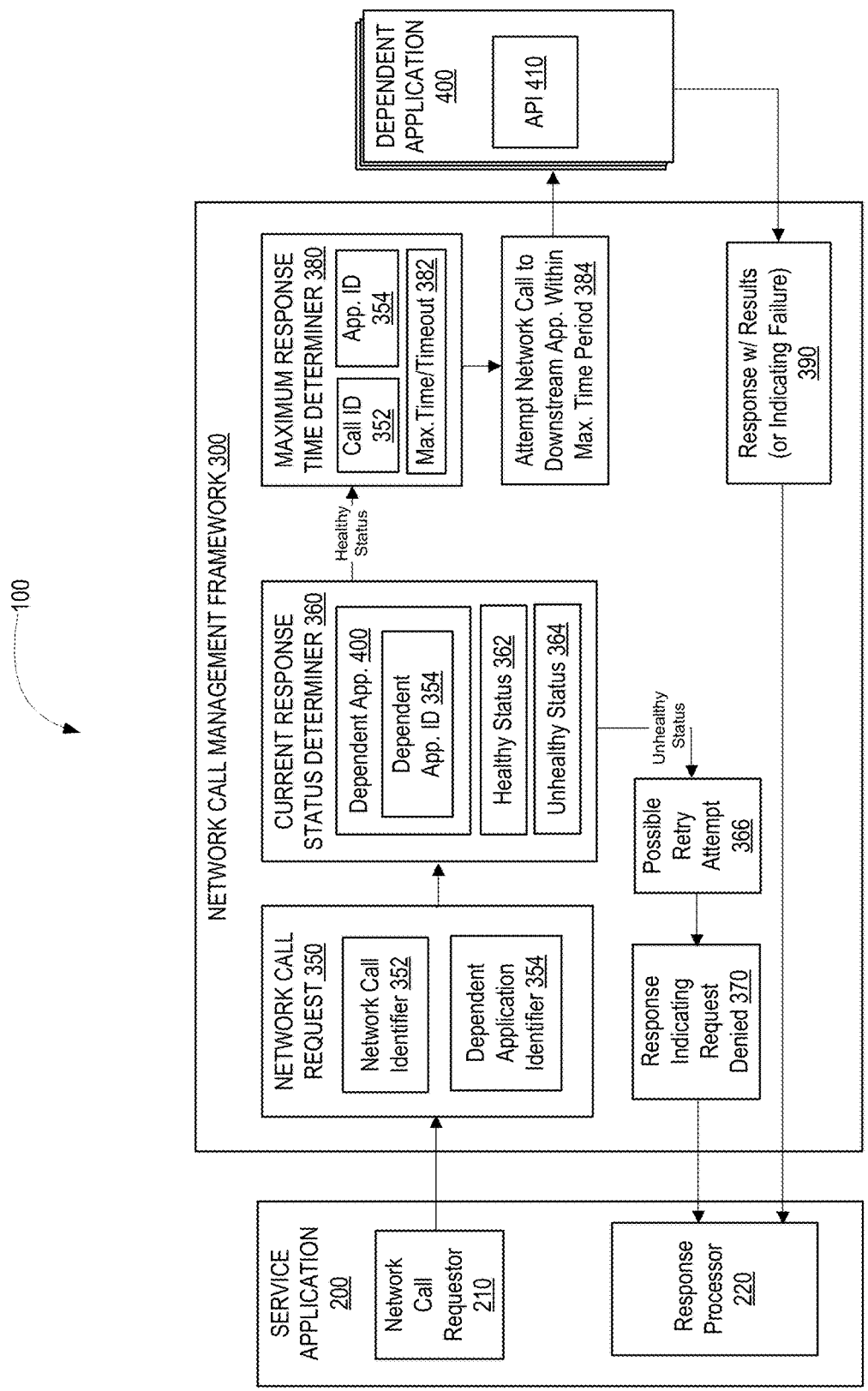
Figure 2:
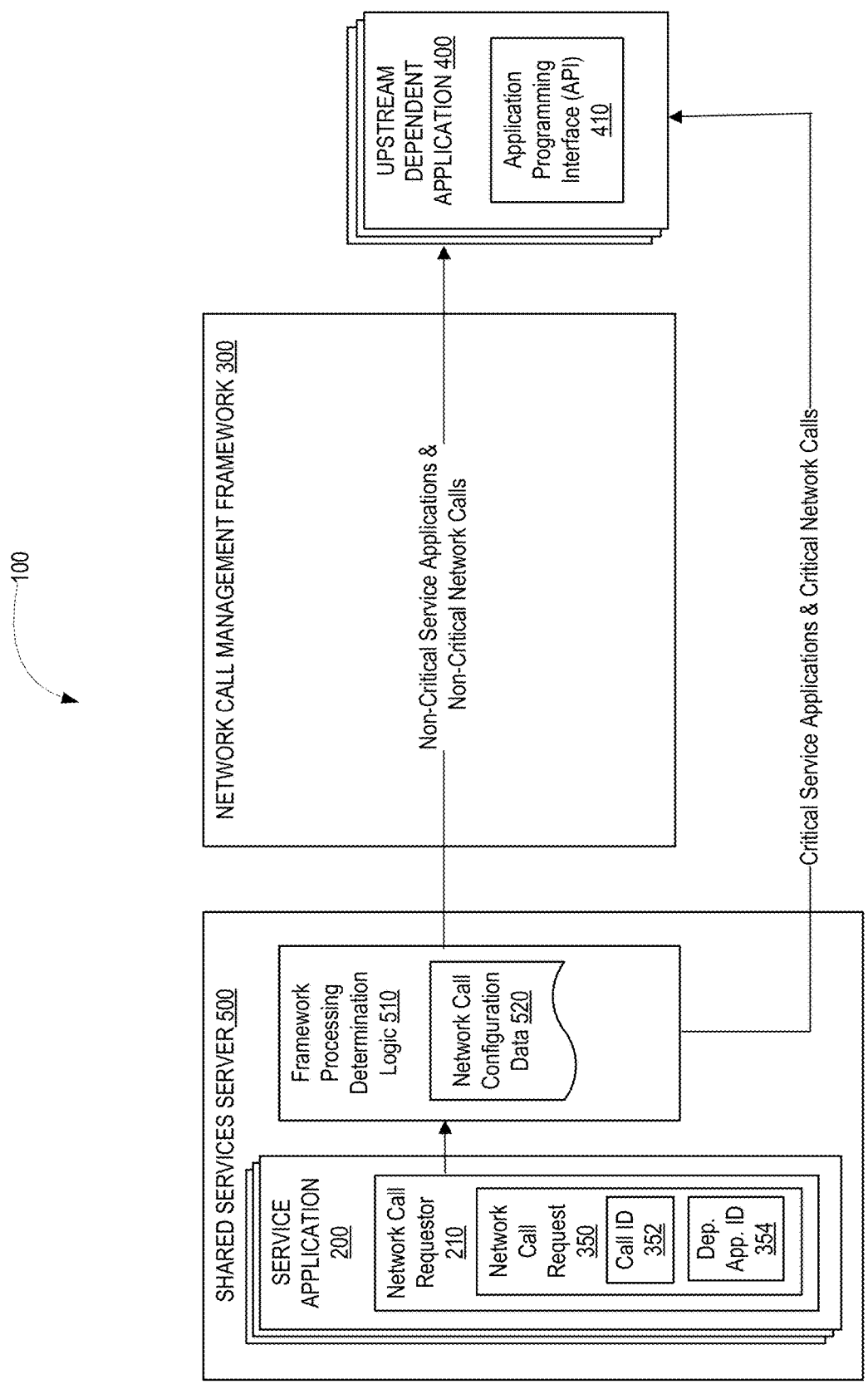
Figure 3:
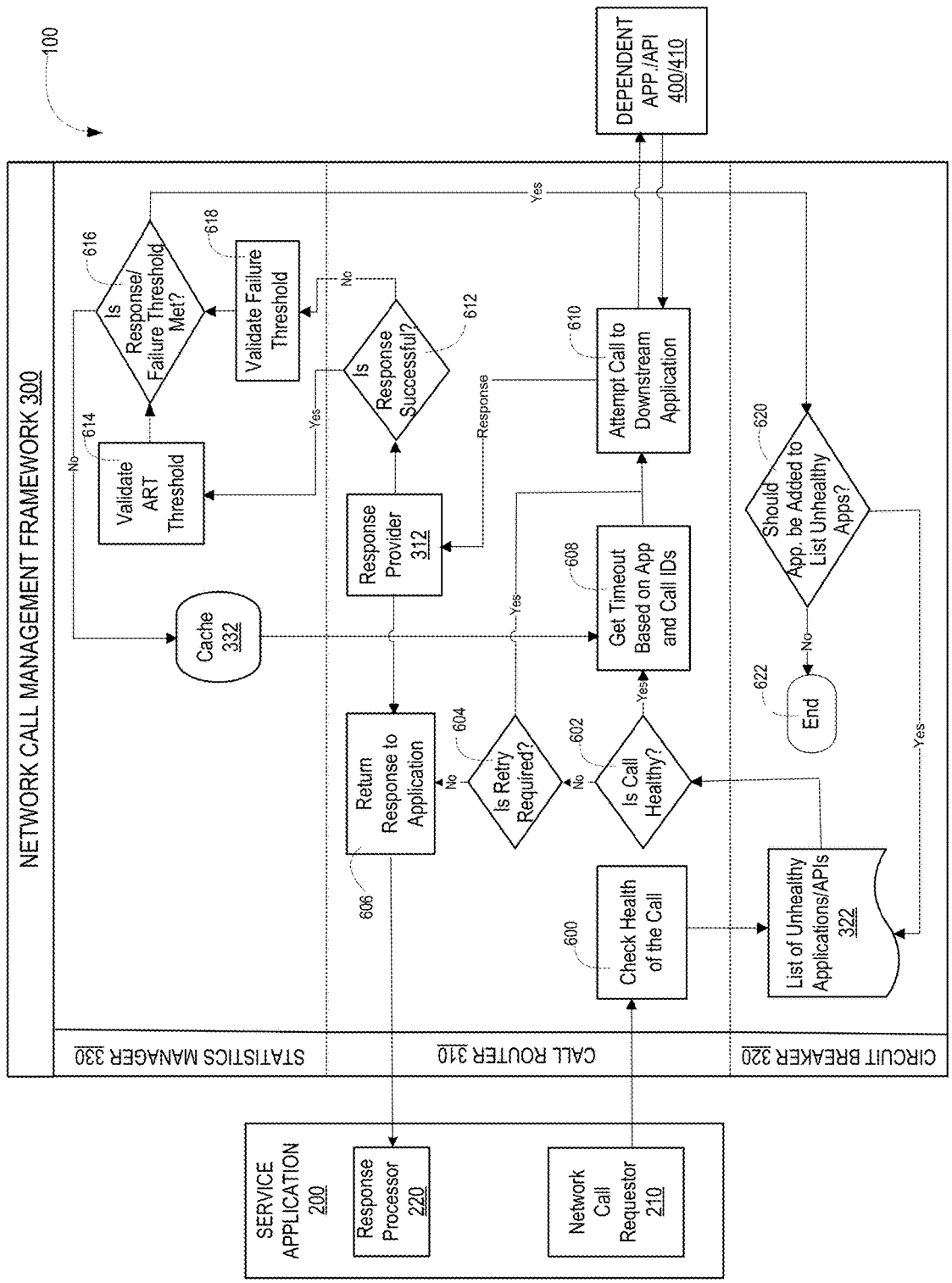
Figure 4:
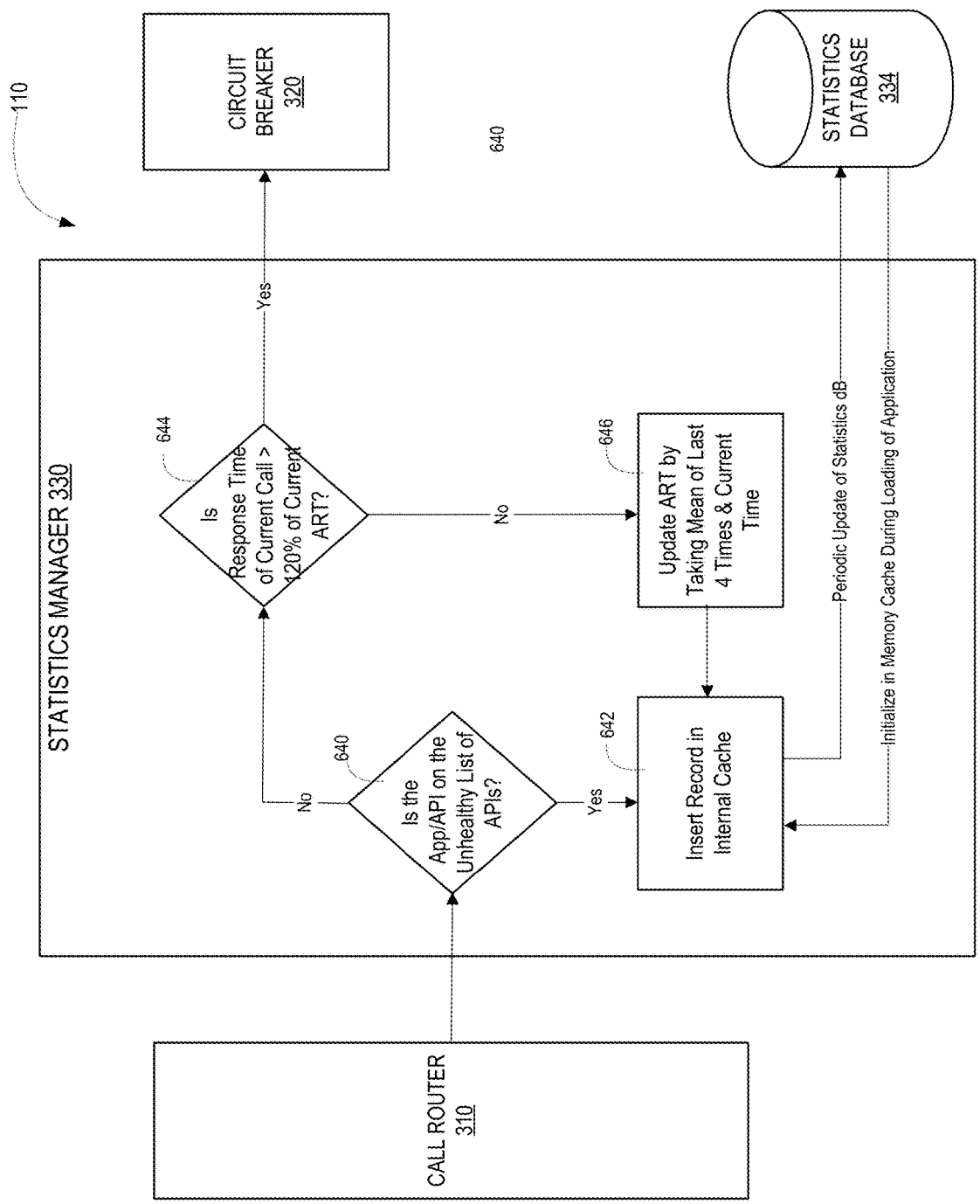
Figure 5:
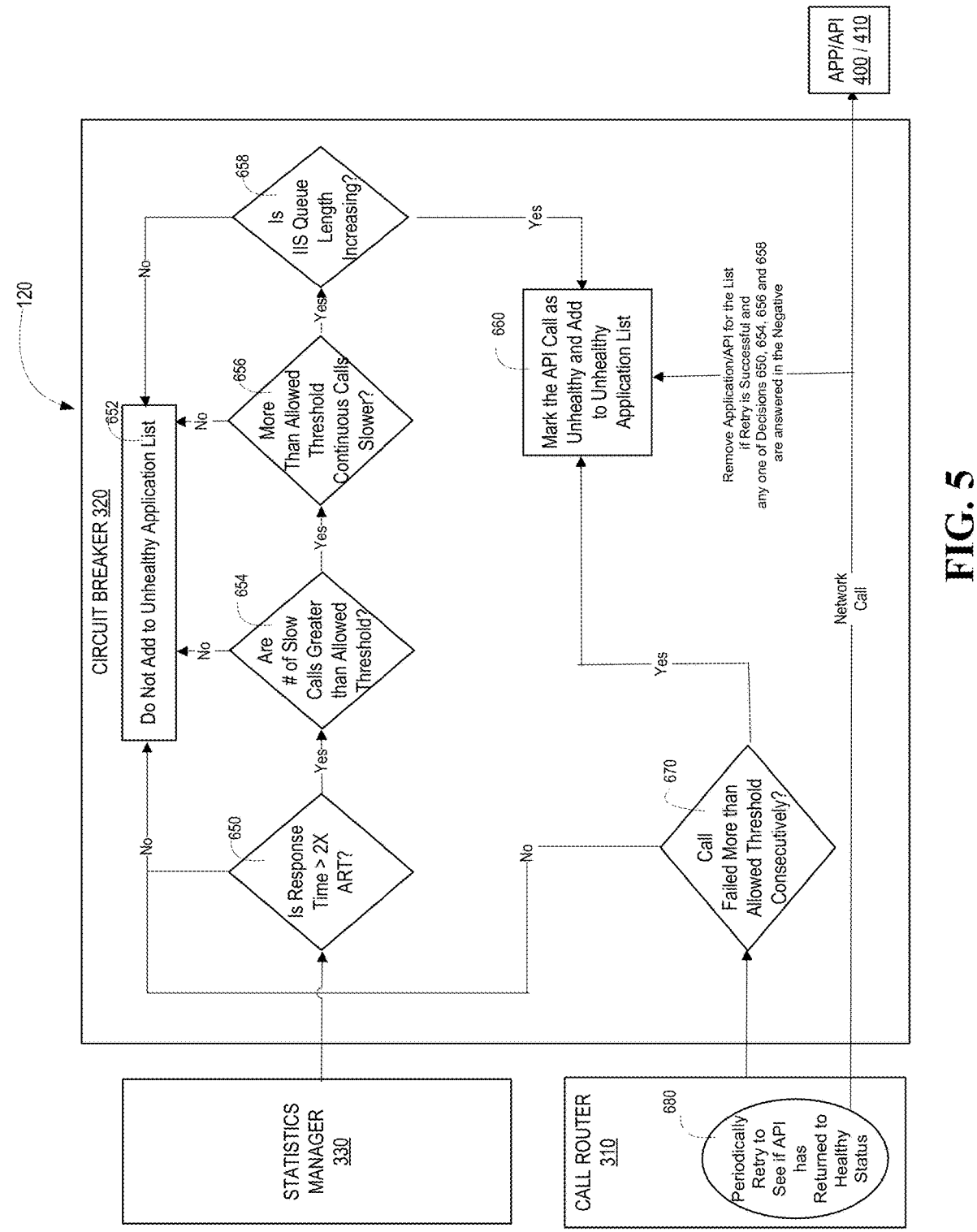
Figure 6:
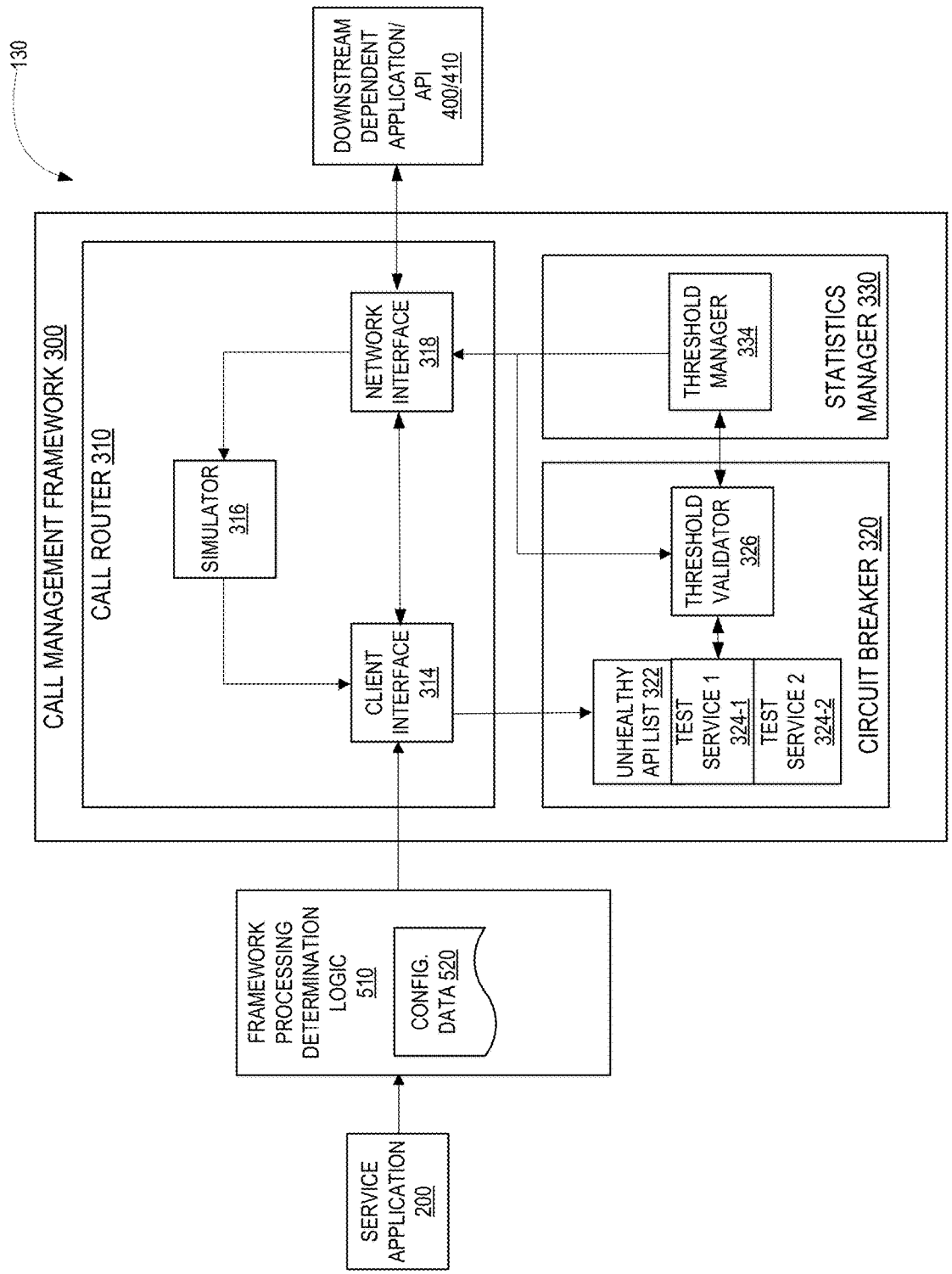
Figure 7:
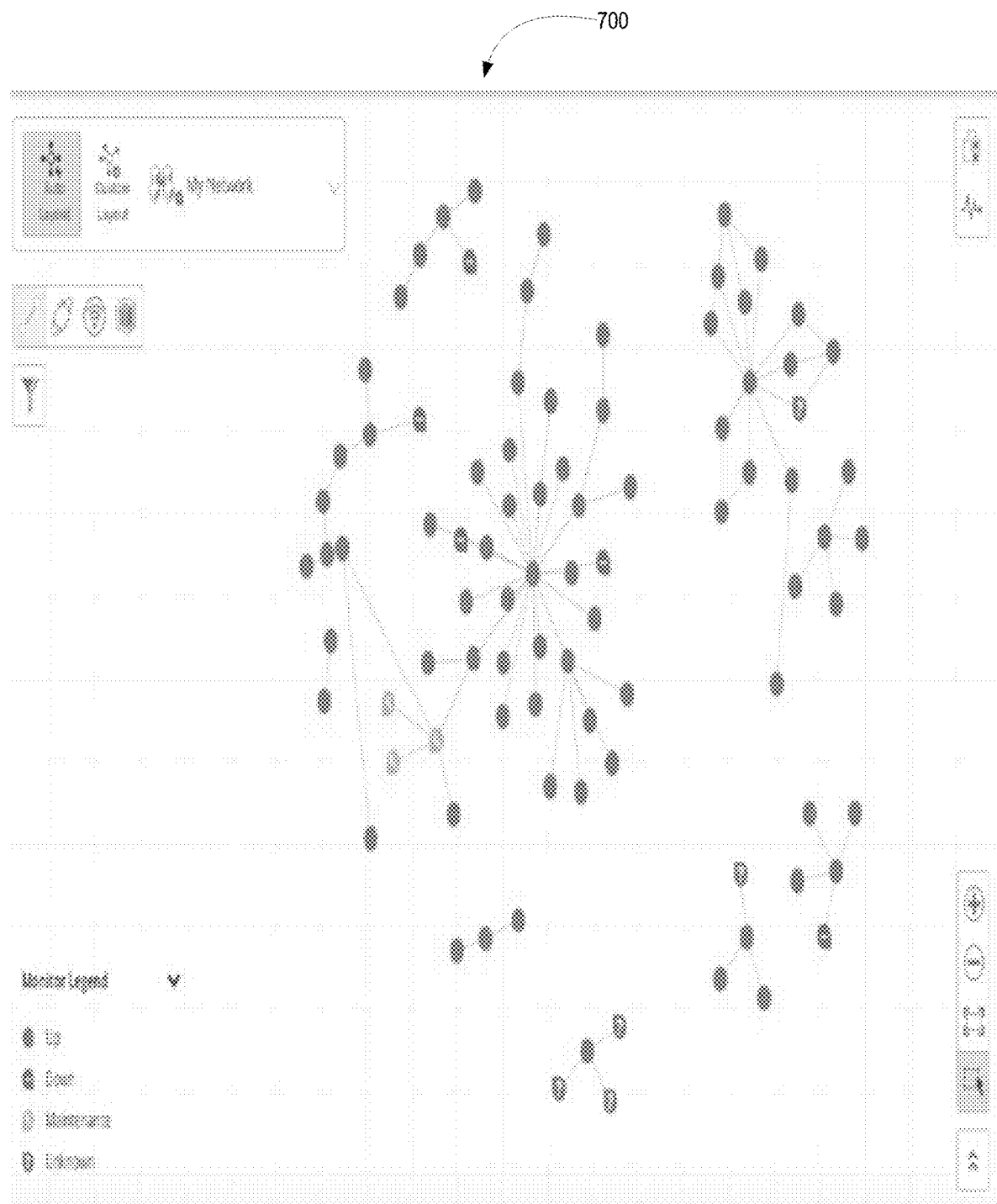
Figure 8:
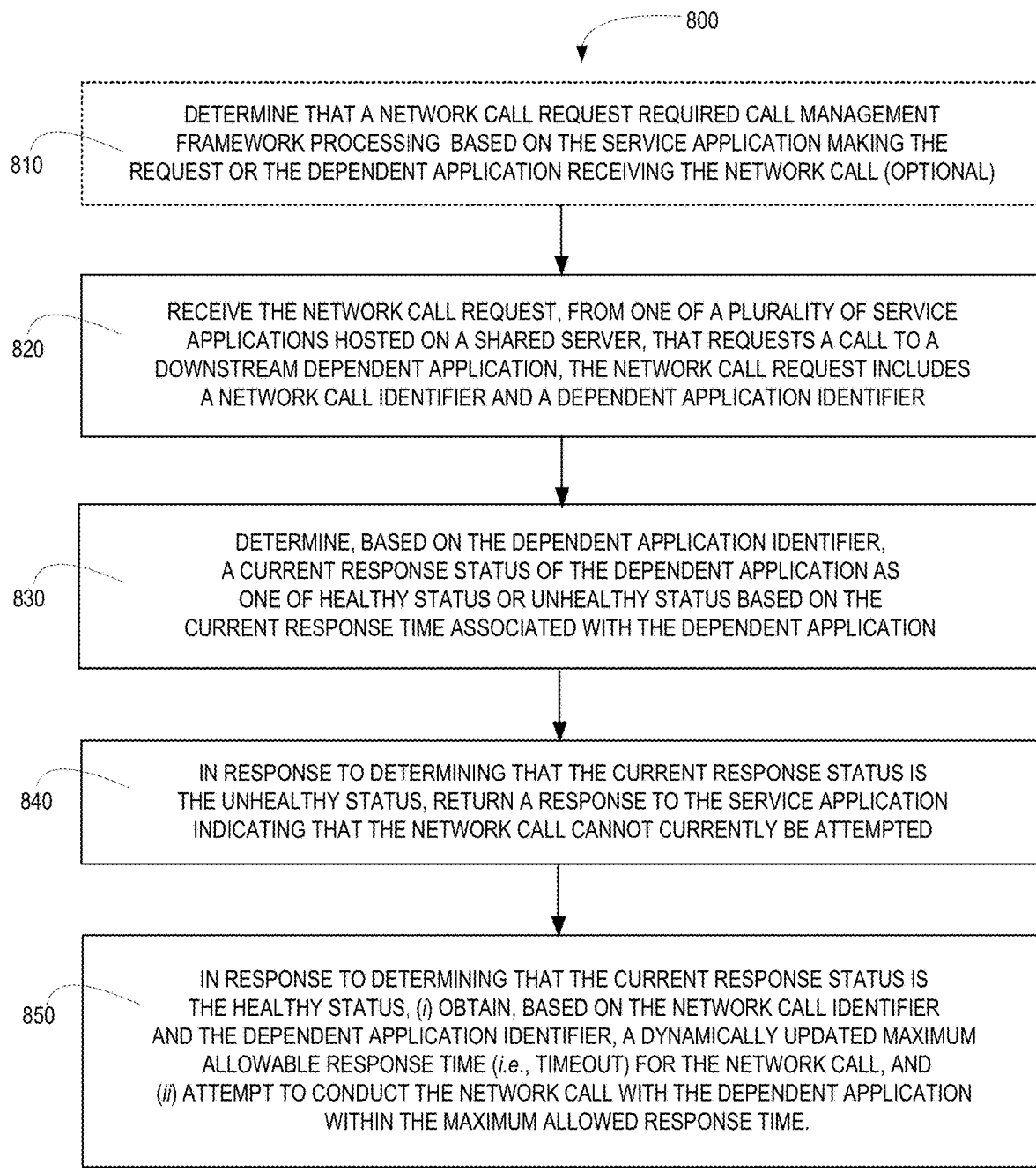

Having thus described embodiments of the invention in general terms, reference will now be made the accompanying drawings, wherein:

FIG. 1 is a block/flow diagram of a system for managing outbound network calls to from service/client applications to upstream dependent applications, in accordance with embodiments of the present disclosure;

FIG. 2 is a block/flow diagram of a system for managing outbound network calls to from service/client applications to downstream dependent applications, in accordance with embodiments of the present disclosure;

FIG. 3 is a detailed is a block/flow diagram of a system for managing outbound network calls to from service/client applications to downstream dependent applications, in accordance with embodiments of the present disclosure;

FIG. 4 is a block/flow diagram of methodology within a statistics manager for determining if a current response time warrants consideration for the application/API being added to the unhealthy application/API list, in accordance with embodiments of the present invention;

FIG. 5 is block/flow diagram of a methodology within a circuit breaker for determining whether to add an Application/API to the unhealthy application/API list, in accordance with embodiments of the present invention;

FIG. 6 is block/flow diagram of illustrating simulator/test mode operation of the call management framework, in accordance with embodiments of the present invention;

FIG. 7 is user interface/dashboard for indicating current status of dependent applications, in accordance with embodiments of the present invention; and FIG. 8 is a flow diagram of method for managing outbound network calls to from service/client applications to downstream dependent applications, in accordance with embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, embodiments of the invention provide for a network call management framework that automatically detects slow Application Programming Interfaces (APIs) at downstream dependent applications based on constantly measuring and monitoring the response time coming from such downstream dependent applications. Once a slow or down API, otherwise referred to as "unhealthy" API/application has been identified, the present invention provides the capability to temporarily shut down (otherwise referred to herein as, "short-circuit") the network call path associated therewith until the monitoring determines that the response time is back to an acceptable level (i.e., returns to a healthy state). In this regard, while a network call path is short-circuited most network calls to the API/application will not be attempted, only a prescribed amount of network call retries to the slow/down API/application will be authorized as a means for monitoring whether the response time is back to an acceptable level.

In specific embodiments of the invention, the call management framework of the present invention is implemented in conjunction with shared servers hosting a plurality of different application. Some of these different applications or specific network call requests associated with an application may be deemed to be critical to the entity running the applications. As such, in specific embodiments the invention determines at the onset whether a network call request is coming from an application deemed critical or non-critical or whether the network call itself is deemed critical or non-critical. In such embodiments of the invention, only the calls coming from non-critical applications or otherwise non-critical network call requests are processed via the call management framework of the present invention. In this regard, critical applications or critical network call requests are not subject to being temporarily shut down/short-circuited and will proceed regardless of delays in the response time seen by the corresponding API, while non-critical applications or non-critical calls that are experiencing response delays may be short-circuited as a means of insuring that the critical application network calls are processed without delay at the shared server.

Moreover, the present invention provides a user interface/dashboard that allows users to observe the current status of all of the dependent applications. In this regard, the dashboard is configured to indicate which of the network call paths are currently functional, which of the network paths are currently down (non-functional), which of the network paths are currently slowed down and as a result shut-down/short-circuited and which of the network paths are currently not being monitored and, thus, the status of which is unknown. Such information is valuable in allow a user to visualize the various links and dependencies in the network call outs and to identify and address, in real time, issues as they become known.

Turning now to the figures, FIG. 1 illustrates a block/flow diagram of a system 100 for managing outbound network calls, in accordance with embodiments of the present invention. The system includes a service/client application 200 which typically is hosted on a server (not shown in FIG. 1). In response to receive a command from a user (e.g., a command requesting data or another service), the service application 200 executes network call requestor 210 to initiate a network call request 350 to downstream dependent application 400. The network call request 350, which includes a network identifier 352 and dependent application/API identifier 354, is communicated to network call management framework 300 which is configured to determine whether the network call should be attempted based on the current response time being exhibited by the dependent application 400 to which the network call is being requested.

In this regard, network call management framework 300 implements current response status determiner 360 to determine the current response status as one of healthy status 362 or unhealthy status 360 based on the dependent application/API identifier 354 in the network call request 350. As will be discussed infra., in specific embodiments of the invention, the current response status determiner implements a dynamic list of dependent applications/APIs that have been determined to currently be unhealthy. In such embodiments of the invention, once a network call request 350 is received a check is made to the unhealthy application/API list to determine if the dependent application 400 to which the call is requested is currently on the list. If the dependent application is not currently listed, the dependent application is deemed to be healthy and a network call request is authorized to proceed.

In response to the current response status determiner 360 determining that dependent application/API 400 has a current unhealthy status 364, a retry attempt 366 may possibly be attempted if the network call request meets predetermined criteria (e.g., based on time between previous attempts or the number of previous requests without a retry attempt). If no retry 366 is attempted, a response 370 that indicates the request has been denied is communicated back to the response processor 220 of the service/client application 200.

In response to the current response status determiner 360 determining that dependent application/API 400 has a current healthy status 364, maximum response time (i.e., timeout) determiner 380 is executed to obtain/determine a dynamic maximum response time 382 (i.e., the maximum time to wait for a response from dependent application 400, after which, the call is determined to have failed). The dynamic nature of the maximum response time 382 is based on determining the maximum response time 382 from a current average response time (ART), which takes into account a predetermined number of last-in-time response times coming from the dependent application 400. As such, the maximum response time 382 will vary, over time, depending on the current ART of the dependent application 400. Once the maximum response time/timeout 382 has been obtained, the framework attempts 384 a network call to the downstream application and awaits a response for the duration of the maximum response time/timeout 382. A response 390 including the requested data or service returned by the downstream application 400, is communicated back to the response processor 220 of the service/client application 220 or in the event that the call failed (i.e., no response was received within the maximum response time/timeout period 382) the response 390 includes an indication that the call failed.

Referring to FIG. 2 a block/flow diagram of a system 100 for managing outbound network calls, in accordance with embodiments of the invention. In the illustrated embodiments of FIG. 2 a plurality of different service/clients applications 200 are hosted on a shared services server 500. Some of the service/client applications 200 hosted on shared services server 500 or some of the specific network calls made by these service/client applications 200 may be deemed, by the controlling entity, as critical to maintaining services for the client and/or entity or the like.

Thus, according to the illustrated embodiments of the invention, prior to subjecting a network call request 350 to the network call management framework 300, the network call request 350 is processed by framework processing determination logic 510 to determine whether the network call request 350 requires processing by the network call management framework 300 (i.e., whether the network call request should be subject to potentially being denied to current response time delays at the dependent application). In specific embodiments of the invention, framework processing determination logic 510 implements network call configuration data 520 which is configured to indicate which service applications 200 are critical (or conversely may be configured to indicate which service applications 200 are non-critical) and, in some embodiments, configured to indicate which specific network calls are critical (or conversely may configured to indicate which specific network calls are non-critical). In such embodiments of the invention, network call configuration data 520 may indicate listing of a service application 200 and a corresponding dependent application 400, such that, network calls, between the designated service application 200 and the corresponding dependent application 400 are deemed critical (or conversely, non-critical). It should be noted that specific network calls designated as critical network calls may come from service/client applications 200 deemed critical or from service/client applications 200 deemed non-critical 200 (i.e., otherwise non-critical service/client applications 200 may have one or more network calls that are critical to the application 200)

If the service/client application 200 or the specific network call is determined by the framework processing determination logic 510 to be non-critical, the network call request 350 is processed by the network call management framework 300. This means that the network call request 350 may be subject to being denied if the current response time of the dependent application/API 400, 410 to which the call is being made has been determined to be unacceptably slow (or the dependent application/API 400, 410 is determined to be down).

If the service/client application 200 or the specific network call is determined is determined by the framework processing determination logic 510 to be critical, the network call request 350 is not processed by the network call management framework 300. This means that the network call request 350 is not subject to being denied based on the current response time of the dependent application/API 400, 410 to which the call is being made and the call request 350 is made directly to the dependent application 400 regardless of the current response time of the dependent application. In this regard, due to the critical nature of the service application or the specific network calls, these calls are insured of being at least attempted regardless of the current response time of the dependent application.

Referring to FIG. 3, a more detailed block/flow diagram is depicted of a system 100 for managing outbound network calls, in accordance with specific embodiments of the invention. In addition to providing greater detail, FIG. 3 highlights various alternative embodiments of the invention. Network call management framework 300 is disposed within the memory (not shown in FIG. 3) of a computing platform (not shown in FIG. 3), which may comprise one or more computing devices (e.g., servers, routers or the like). The computing platform is configured to execute frameworks, engines, including models, algorithms, modules, routines, applications and the like. The memory may comprise volatile and non-volatile memory, such as read-only and/or random-access memory (RAM and ROM), EPROM, EEPROM, flash cards, or any memory common to computing platforms). Moreover, the memory and the like may comprise cloud storage, such as provided by a cloud storage service and/or a cloud connection service.

Further, the computing platform also includes at least one processing device (not shown in FIG. 3) that is configured to execute the network call management framework 300. The processing device(s) may be an application-specific integrated circuit ("ASIC"), or other chipset, logic circuit, or other data processing device. The processing device(s) or the like may execute one or more application programming interface (APIs) that interface with any resident programs, such as network call management framework 300 or the like stored in the memory of the computing platform. The processing device(s) 304 may include various processing subsystems embodied in hardware, firmware, software, and combinations thereof, that enable the functionality of the computing platform and the operability of the computing platform on a communications network (not shown in FIG. 3). For example, processing subsystems allow for initiating and maintaining communications and exchanging data with other networked devices, such as servers 200 and downstream dependent applications 400. For the disclosed aspects, processing subsystems of computing platform may include any processing subsystem used in conjunction with network call management framework 300 and related engines, tools, routines, sub-routines, algorithms, sub-algorithms, sub-modules thereof.

Computing platform additionally includes a communications module (not shown in FIG. 3) embodied in hardware, firmware, software, and combinations thereof, that enables wired and/or wireless electronic communications between the computing platform and other network devices, such as server 200 and dependent applications 300. Thus, communication module may include the requisite hardware, firmware, software and/or combinations thereof for establishing and maintaining a network communication connection with one or more network devices.

The network call requestor 210 of service/client application 200 is configured to generate the network call request including a network call identifier and a dependent application identifier. At Event 600, the call router 310 receives the network call request and the health of the call is checked by accessing the list of unhealthy dependent application/API. At Decision 602, a determination is made as to whether the call is healthy based on whether the dependent application/API ID is included in the unhealthy application/API list 322. If the call is determined to unhealthy, at Decision 604, a determination is made as to whether a retry attempt is warranted. A retry attempt may be warranted based on the predetermined time threshold between retry attempts or, in other embodiments, a predetermined number of network call requests (e.g., once every 100 requests or the like). In response to determining no retry attempt is warranted, at Event 606, a response is returned to the response processor 220 of the service/client application, which in this instance indicates that network call request has been denied.

If the call is determined to be healthy (i.e., the dependent application/API Identifier is not currently listed on the unhealthy list of dependent applications/APIs), at Event 608 a dynamically updated maximum response time/timeout is determined based on dependent application and network call identifiers. In this regard, each dependent application has its own timeout which may be dynamically updated based on the ART, which reflects a predetermined number of last-in-time response times for the dependent application 400/Once the timeout has been determined, at Event 610, the network call is attempt to the downstream dependent application 400. The call router 300 waits for a response from the dependent application/API 400, 410 until the expiration of the maximum response time/timeout. The response is communicated response provider 312 and, at Event 606, and the response (e.g., data/service response provided by the dependent application or a failure response) is returned to the response processor 220 of the service application 200.

At Decision 612, the call router determines if the response is successful 612. If the response is successful, at Event 614, within the statistics manager 330, the ART threshold is validated/updated and, if the response is unsuccessful (i.e., failed), at Event 618, the failure threshold is validated/ updated. At Decision 616 (which is detailed in relation to FIG. 4, infra.), a determination is made as to whether the response time exceeds the response time threshold (or the failure threshold is met), such that the network call response warrants consideration for inclusion in the unhealthy application list 322. If the response time does not exceed the threshold (or the failure threshold is not met), the response time is stored in the internal cache 332. If the response time does meet the threshold (or the failure threshold is met), details of the response are communicated to the circuit breaker. At Decision 620 (which is detailed in relation to FIG. 5, infra.), a determination is made as to whether the application/API should be included in the unhealthy application/API list 322. The determination may be based on one or more of (i) the response time in comparison to the ART, (ii) the number of slow application/API calls in comparison to an predetermined threshold of calls, (iii) whether a predetermine number of calls have continuously been slower, (iv) whether the server is currently experiencing an increasing queue length.

Referring to FIG. 4, a block/flow diagram is depicted of a sub-process 110 within the network call management framework for determining whether a call response should be considered for determining whether the dependent application is unhealthy (i.e., should be considered for inclusion in the unhealthy app/API list) or considered for ART purposes. The call router 310 of the framework 300 forwards details associated with a network call response to the statistics manager 330. At Decision 640, a determination is made as to whether the call response-providing dependent application/API is currently on the list of unhealthy applications/APIs. If the dependent application/API is determined to currently be on the list of unhealthy applications/APIs, at Event 642, the response time in entered into the internal cache (332 of FIG. 3). If the dependent application/API is determined to not currently be on the list of unhealthy applications/APIs, at Decision 644, a determination is made as to whether the response time of the call is greater than the current ART by a predetermined percentage. In the example shown in FIG. 4 the predetermined percentage is 120% (i.e., 20% greater than the current ART). For example, if the ARP is 100 milliseconds, the determination is assessing whether the response time of the call is greater than 120 milliseconds.

If the determination is made that the response time of the current call is not greater than the predetermined percentage of the current ART, at Event 646 the average response time for the dependent application/API is updated by taking the mean value of a predetermined number of last-in-time response times and the response time for the current call. Once the updated ART is calculated it is returned to the internal cache. As shown in FIG. 7 the internal cache periodically sends updated data to the statistics database 334, which in turn, initialized data in the cache during loading of the service/client application (i.e., prior to network call requests).

If the determination is made that the response time of the current call is greater than the predetermined percentage of the current ART, the dependent application/API is deemed to a candidate for inclusion in the unhealthy application/API and the details on the associated with the network call response are forwarded to the circuit breaker 320 of the framework 300 for further processing (i.e., determining whether to include the application/API in the unhealthy application/API listing), which is discussed in relation to FIG. 5.

Referring to FIG. 6, a block/flow diagram is depicted of a sub-process 120 within the network call management framework for determining whether a dependent application/API should be added to listing of unhealthy applications/APIs, in accordance with embodiments of the present invention. The statistics manager 330 of framework 300 sends call response details to the circuit breaker 320 for a call response that the statistics manager 330 has determined to be slow (i.e., greater than a predetermined percentage of the ART for the application/API) (i.e., the flow described in relation to FIG. 4).

At Decision 650, a determination is made as to whether the response time of the current call is greater than the ART by predetermined amount. In the illustrated example of FIG. 5, the predetermined amount is twice (2X) the ART. If it is determined that the response time of the current call is not greater than the ART by the predetermined amount, at Event 652, the associated dependent application/API is not added to the list of unhealthy applications/APIs.

If it is determined that the response time of the current call is greater than the ART then, at Decision 654, a determination is made as to whether the number of slow calls to the dependent application (including the current call) exceeds a predetermined threshold. If it is determined that the number of slow calls to the dependent application/API does not exceed the predetermined threshold number of calls, at Event 652, the associated dependent application/API is not added to the list of unhealthy applications/APIs.

If it is determined that the number of slow calls to the dependent application/API does exceed the predetermined threshold number of calls them at Decision 656, a determination is made as to whether the more than a predetermined number of continuous calls have been determined to be slower (i.e., the call are increasingly slower). If it is determined that the predetermined number of continuous calls have not been determined to be slower, at Event 652, the associated dependent application/API is not added to the list of unhealthy applications/APIs.

If it is determined that the predetermined number of continuous calls have been determined to be slower, at Decision 658, a determination is made as to whether the network call request processing queue (IIS) at the server is increasing length. If the processing queue at the server is not increasing in length, at Event 652, the associated dependent application/API is not added to the list of unhealthy applications/APIs.

If the network call request processing queue is increasing at length at the server, at Event 660, the network call is marked as unhealthy and the corresponding dependent application/API is added to the list of unhealthy applications/APIs. If the processing queue at the server is not increasing in length (i.e., exhibiting a backlog of network call request) there is no need to add the dependent application/API to the listing of unhealthy APIs. In other words, the listing of unhealthy applications/APIs only exists in the event that the server is experiencing an increase in the network call request queue.

In the illustrate embodiment of FIG. 5, all four decisions 650, 654, 656, and 658 must result in a positive/affirmative response in order for the dependent application/API to be added to the unhealthy application/API list. In other embodiments of the invention, only one or more of the decisions 650, 654, 656 and 658 are required for the dependent application/API to be added to the unhealthy application/API list.

In addition to slow applications/APIs, the circuit breaker 320 is also configured to determine whether failed calls should result in the associated dependent application/API being placed on the unhealthy application/API list. The call router 310 of the framework sends the circuit breaker 320 details of a failed network call. At Decision 670, a determination is made as to whether more than a predetermined number of consecutive calls to the dependent application/API failed. If it is determined that the predetermined number of consecutive call to the dependent application/API have not failed, at Event 652, the associated dependent application/API is not added to the list of unhealthy applications/APIs. If it is determined that the predetermined number of consecutive call to the dependent application/API have failed, at Event 660, the network call is marked as unhealthy and the corresponding dependent application/API is added to the list of unhealthy applications/APIs.

In addition, FIG. 5 shows that the call router 310 will periodically conduct retry attempts to dependent applications/APIs that are currently on the unhealthy application/API list to determine if the application/API has returned to a healthy status. If the retry call is successful and the circuit breaker responds in the negative to any one of Decisions 650, 654, 656 and 658, the dependent application/API is removed from the unhealthy application/API list.

Referring to FIG. 6 a block/flow diagram of a system 130 for simulating the network call management framework 300, in accordance with other specific embodiments of the invention. In the simulation mode the network call management framework is configured to simulate actual network call requests for the purposes of determining initial average response times (ARTs) for downstream dependent applications/APIs 400, 410. In the simulation/test mode the service application 200 communicates a network call request to the framework processing determination logic 510, which is configured to determine whether the request requires processing by the framework 300. As previously discussed in relation to FIG. 2, logic 510 relies on configuration data 510 which lists network calls associated with specific service application 200 and dependent application 400 pairs that are deemed as critical and, therefore, forego processing by the framework 300. The call router 310 includes client interface 314 which receives the network call request and forwards to simulator 316, which attempts the network the network call via network interface 318 for purposes of simulating an actual network call to render a ART for the dependent application 400. The results of the network call are forwarded to statistics manager 334 at which threshold manager 334 determines whether the response time is slow and, therefore subject to consideration for unhealthy App/API list 322 inclusion. In addition, circuit breaker 320 receives the results of the network call and data from threshold manager 334 to validate the thresholds at threshold validator 326. If the network response warrants inclusion in the unhealthy app/API list 322, the App/API is added to the list, such as entries test service 1 324-1 and test service 2 324-2.

Referring to FIG. 7 an exemplary user interface dashboard 700 is depicted that is configured to indicate the dependencies of various downstream and upstream dependent applications and the current response status of the dependent applications. In the illustrated example of FIG. 7, the user interface/dashboard depicts (i) solid/black circular designators as dependent applications/APIs that are currently up and responding, (ii) clear/white circular designators as dependent applications/APIs that are currently down and not responding, (iii) shaded/cross-hatched circular designators as dependent applications/APIs that are listed as currently having an unhealthy status, and (iv) question marked circular designators as dependent applications/APIs in which the status is currently unknown. The user interface/dashboard is configurable such the user may observe all of the dependent applications associated with all of the entities service/client applications, all of the dependent applications associated with service/client applications hosted on a single shared server or all of the dependent applications associated with a single service/client application. The user interface/dashboard shown in FIG. 7 is instrumental of providing a user real-time indication of current response status of downstream and upstream dependent applications, such that, a user can make adjustments, on-the-fly, (e.g., redirect calls to other applications or the like) or take other actions to mitigate delays occurring upstream and downstream.

Referring to FIG. 8 a flow diagram is depicted of a method 800 for managing outbound network call requests, in accordance with embodiments of the present invention. At optional Event 810, a determination is made that a network call requests requires call management framework processing (i.e., requires to determination of whether the request should be authorized to proceed based on current response times). The determination is based on the service/client application making the network call and the dependent application receiving the network call. In specific embodiments of the invention the determination relies on pre-configuration of service application and dependent application pairs that are deemed critical network calls or non-critical network calls. As previously described, in specific embodiments of the invention, critical service applications and/or critical network calls are not subjected to the call management framework processing so as to allow for critical network calls to proceed without the possibility of being denied due to delays in current response time.

At Event 820, a network call request is received, at the aforementioned network call management framework, from one of a plurality of serve/client applications hosted on a shared server. The network call request is configured to request a data/service call to an downstream service application and includes a network call identifier and a dependent application identifier.

At Event 830, a current response status from amongst a healthy status and an unhealthy status is determined based on the dependent application identifier in the request and the current response time associated with the dependent application. In specific embodiments of the method, determining the current response status includes accessing an unhealthy listing of dependent applications or related APIs that have determined via monitoring to currently exhibit response times that are deemed to be unacceptable.

At Event 840, in response to determining that the current response status is the unhealthy status and, in some embodiments of the method, determining that a retry is not warranted at this time, a response is returned to the service/client application that indicates that the network call request is denied (i.e., currently cannot be attempted).

At Event 850, in response to determining that the current response status is the healthy status, a dynamically updated maximum response time/timeout is determined/obtained for the network call, which is based on the dependent call identifier and associated with the network call identifier. In specific embodiments of the invention, the maximum response time is determined based on the current ART, which is calculated based a predetermined number of last-in-time response times associated with the corresponding dependent application/API. In response to determining the maximum response time/timeout, a network call is attempted with the dependent application/API within the allotted maximum response time.

Once the dependent application API responds within the maximum response time (or fails to respond with the maximum response time) further analysis ensues to update the current ART and determine whether the response time of the current network call warrants the dependent application/API to deemed slow (i.e., included in the listing of unhealthy dependent applications/APIs.

As evident from the preceding description, the systems, methods and the like described herein represents an improvement in technology, specifically, embodiments of the present invention provide a resilient network call management framework that automatically detects slow Application Programming Interfaces (APIs) at downstream dependent applications based on constantly measuring and monitoring the response time coming from such applications. Once a slow API has been identified, the framework provides the capability to temporarily shut down (otherwise referred to herein as, "short-circuit") the network call path associated therewith until the monitoring determines that the response time is back to an acceptable level (i.e., returns to a healthy status). Implemented in conjunction with a shared services server hosting different service applications, processing by the framework may be limited to only those service applications or network calls deemed non-critical, as a result, critical service applications or network calls are not subjected to being shut down regardless of response time.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for managing out-bound network calls, the system comprising:
 a shared server configured to host a plurality of service applications, each of the service applications configured to receive user requests that require network calls to one or more of a plurality of dependent applications;
 a computing platform including a memory and at least one processing device in communication with the memory; and
 a network call management framework stored in the memory, executable by the processor and configured to:
  receive a network call request, from one of the plurality of service applications, that requests a network call to one of the dependent applications, wherein the network call requests and includes a network call identifier and a dependent application identifier;
  determine, based on the dependent application identifier, a current response status of the dependent application as one of unhealthy status or heathy status based on the current response time associated with the dependent application;
  in response to determining that the current response status is the unhealthy status, return a response to the service application indicating that the network call cannot currently be attempted; and
  in response to determining that the current response status is the healthy status, (i) obtain, based on the network call identifier and the dependent application identifier, a dynamically updated maximum allowed response time for the network call and (ii) attempt to conduct the network call with the dependent application within the maximum allowed response time.

2. The system of claim 1, wherein the shared server further comprises call management logic configured to determine, based on at least one of the service application and the dependent application, that the network call request requires processing by the network call management framework.

3. The system of claim 1, wherein the network call management framework is configured to determine the current response status of the dependent application by accessing a listing of dependent applications currently having the unhealthy status, wherein the unhealthy status is based at least on a corresponding current response time.

4. The system of claim 3, wherein the network call management framework is further configured, in response to determining that the dependent application is included in the listing of dependent applications currently having the unhealthy status, determine whether a retry attempt for the network call is required based on of (i) a time between previous network call attempts to the dependent application, or (ii) a predetermined number of network call requests to the dependent application.

5. The system of claim 3, wherein the network call management framework is further configured, in response to attempting to conduct the network call with the dependent application within the maximum allowed response time, receive a response from the dependent application within the maximum allowed response time and validate an average response time for the dependent application.

6. The system of claim 5, wherein the network call management framework is further configured to validate the average response time by (i) determining whether a current response time is greater by a predetermined amount than the current average response time, and (ii) in response to determining that the current response time is not greater than the predetermined amount of the current average response time, update the average response time as a mean of a predetermined number of last-in-time previous response times and the current response time.

7. The system of claim 6, wherein the network call management framework is further configured to, in response to determining that the current response time is greater by the predetermined amount than the current average response time, determine whether to include the dependent application in the listing of dependent applications currently in the unhealthy state.

8. The system of claim 7, wherein the network call management framework is further configured to determine whether to include the dependent application in the listing of dependent applications currently in the unhealthy state based on one or more of (i) the response time is greater than twice an average response time, (ii) a number of slow network calls to the dependent application is greater than a predetermined threshold number of calls, (iii) the network calls exceeds the maximum threshold of continuous slow calls, and (iv) a queue length at the shared server is increasing, add the dependent application to the listing of dependent applications currently in an unhealthy state.

9. The system of claim 3, wherein the network call management framework is further configured to, in response to attempting to conduct the network call with the dependent application within the maximum allowed response time and failing to receive a response from the dependent application within the maximum allowed response time, determine whether to include the dependent application in the listing of dependent applications currently in the unhealthy state based on exceeding a predetermined threshold of consecutive calls to the dependent application that fail to respond within the maximum allowable time.

10. A computer-implemented method for managing network calls to dependent applications, the method executed by one or more processing devices and comprising:
- receiving a network call request, from one of the plurality of service applications hosted on a shared server, that requests a network call to one of the dependent applications, wherein the network call requests and includes a network call identifier and a dependent application identifier;
- determining, based on the dependent application identifier, a current response status of the dependent application as one of a healthy status or an unhealthy status based on the current response time associated with the dependent application;
- in response to determining that the current response status is the unhealthy status, return a response to the service application indicating that the network call cannot currently be attempted; and
- in response to determining that the current response status is the healthy status, (i) obtain, based on the network call identifier and the dependent application identifier, a dynamically updated maximum allowed response time for the network call, and (ii) attempt to conduct the network call with the dependent application within the maximum allowed response time.

11. The computer-implemented method of claim 10, wherein the method further comprises:
- determining, based on at least one of the service application and the dependent application, that the network call request requires determination of whether the network call can be attempted.

12. The computer-implemented method of claim 10, wherein determining the current response status of the dependent application further comprises accessing a listing of dependent applications currently having the unhealthy status, wherein the unhealthy status is based at least on a corresponding current response time.

13. The computer-implemented method of claim 12, further comprising:
- in response to determining that the dependent application is included in the listing of dependent applications currently having the unhealthy status, determining whether a retry attempt for the network call is required based on one of (i) a time between previous network call attempts to the dependent application, or (ii) a predetermined number of network call requests to the dependent application.

14. The computer-implemented method of claim 12, further comprising:
- in response to attempting to conduct the network call with the dependent application within the maximum allowed response time, receiving a response from the dependent application within the maximum allowed response time and validating an average response time for the dependent application by (i) determining whether a current response time is greater by a predetermined amount than the current average response time, and (ii) in response to determining that the current response time is not greater than the predetermined amount of the current average response time, update the average response time as a mean of a predetermined number of last-in-time previous response times and the current response time.

15. The computer-implemented method of claim 14, further comprising:
- in response to determining that the current response time is greater by the predetermined amount than the current average response time, determining whether to include the dependent application in the listing of dependent applications currently in the unhealthy state based on one or more of (i) the response time is greater than twice an average response time, (ii) a number of slow network calls to the dependent application is greater than a predetermined threshold number of calls, (iii) the network calls exceeds the maximum threshold of continuous slow calls, and (iv) a queue length at the shared server is increasing, add the dependent application to the listing of dependent applications currently in an unhealthy state.

16. A computer program product including non-transitory computer-readable medium that comprises:
- a first set of codes configured to cause a computer processor device to receive a network call request, from one of the plurality of service applications hosted on shared server, that requests a network call to one of the dependent applications, wherein the network call requests and includes a network call identifier and a dependent application identifier;
- a second set of codes for causing a computer processing device to determine, based on the dependent application identifier, a current response status of the dependent application as one of a healthy status or an unhealthy status based on the current response time associated with the dependent application;
- a third set of codes for causing a computer processing device to, in response to determining that the current response status is the unhealthy status, return a response to the service application indicating that the network call cannot currently be attempted; and
- a fourth set of codes for causing a computer processing device to, in response to determining that the current response status is the healthy status, (i) obtain, based on the network call identifier and the dependent application identifier, a dynamically updated maximum allowed response time for the network call, and (ii) attempt to conduct the network call with the dependent application within the maximum allowed response time.

17. The computer program product of claim 16, wherein the computer-readable medium further comprises:
- a fifth set of codes for causing a computer processing device to determine, based on at least one of the service application and the dependent application, that the network call request requires determination of whether the network call can be attempted.

18. The computer program product of claim 16, wherein the second set of codes is further configured to cause the computer processor device to access a listing of dependent applications currently having the unhealthy status based on corresponding current response times.

19. The computer program product of claim 18, wherein the second set of codes is further configured to cause the computer processing device to, in response to determining that the dependent application is included in the listing of dependent applications currently having the unhealthy status, determine whether a retry attempt for the network call is required based on one of (i) a time between previous network call attempts to the dependent application, or (ii) a predetermined number of network call requests to the dependent application.

20. The computer program product of claim 18, wherein the second set of codes is further configured to cause the computing device to:

in response to attempting to conduct the network call with the dependent application within the maximum allowed response time, receive a response from the dependent application within the maximum allowed response time and validate an average response time for the dependent application by (i) determining whether a current response time is greater by a predetermined amount than the current average response time, and (ii) in response to determining that the current response time is not greater than the predetermined amount of the current average response time, update the average response time as a mean of a predetermined number of last-in-time previous response times and the current response time.

* * * * *